(12) United States Patent
Matsumoto (10) Patent No.: US 6,933,980 B1
(45) Date of Patent: Aug. 23, 2005

(54) SHUTTER FOR DIGITAL STILL CAMERA

(75) Inventor: Junichi Matsumoto, Warabi (JP)

(73) Assignee: Nidec Copal Corporation, Tokyo (JP)

( * ) Notice: Subject to any disclaimer, the term of this patent is extended or adjusted under 35 U.S.C. 154(b) by 854 days.

(21) Appl. No.: 09/688,695

(22) Filed: Oct. 17, 2000

(30) Foreign Application Priority Data

Oct. 18, 1999 (JP) ................................. 11-295701

(51) Int. Cl.$^7$ .......................................... H04N 5/238
(52) U.S. Cl. ...................... 348/363; 348/367; 348/368; 396/449; 396/452
(58) Field of Search ................................ 348/363, 367, 348/368; 396/449, 470, 460, 452

(56) References Cited

U.S. PATENT DOCUMENTS

| 5,432,576 A | * | 7/1995 | SanGregory et al. | ....... | 396/449 |
| 5,446,514 A | * | 8/1995 | Matsumoto | ................. | 396/463 |

FOREIGN PATENT DOCUMENTS

| JP | 2-123336 | 5/1990 | | |
| JP | 3-89223 | 4/1991 | | |
| JP | 10-161179 | 6/1998 | | |
| JP | 10221740 A | * | 8/1998 | .......... H04N 5/238 |

* cited by examiner

*Primary Examiner*—Tuan Ho
*Assistant Examiner*—Heather R. Long
(74) *Attorney, Agent, or Firm*—Pillsbury Winthrop Shaw Pittman LLP (57) ABSTRACT

A rotor is constituted by a two-pole permanent magnet, and enabled to rotate by a predetermined angle in a direction corresponding to the direction electric current supplied to a stator coil. Two shutter blades are moved by a driving pin which is integrally provided with the rotor, to perform opening and closing operations. A fully opened state and a closed state, which are obtained by such operations, are maintained by an attractive force, which is obtained from a magnetic force of the rotor and acts between the rotor and each of four iron pins, even when the stator coil is not energized. Further, an exposure aperture regulating position established by a closing operation of the two shutter blades is beyond a midpoint position corresponding to an intermediate state from the fully opened state to the closed state. Moreover, an exposure aperture regulating state is maintained by the attractive force, which acts during a non-energized state the stator coil so as to cause the shutter blades to close, and the urging force of a spring.

6 Claims, 5 Drawing Sheets

SHUTTER FOR DIGITAL STILL CAMERA

BACKGROUND OF THE INVENTION

1. Field of the Invention

The present invention relates to a motor-driven shutter for digital still cameras enabled to photograph by using a small-diameter aperture instead of a proper exposure aperture by the action of two relatively operating shutter blades.

2. Description of the Related Art

Generally, there are two kinds of lens shutters for digital still cameras, which are called "a normally closed shutter" and "a normally open shutter". Between these shutters, the normally open shutter is adapted so that when a power supply switch is closed, shutter blades are in a fully opened state, and an image of an object can be observed on the screen of a monitor, and that when the release button of the camera is depressed, photographing is started by supplying a photographing start signal to an image pickup device. Further, usually, the photographing is finished when an exposure aperture is closed by causing the shutter blades to perform a closing operation according to a photographing end signal, instead of supplying the photographing end signal to the image pickup device. Thereafter, upon completion of transfer of an imaging signal to a storage device during the closed state of the shutter blades, the shutter blades are reset to a fully opened state again. Thus, the camera gets ready for the next photographing. Additionally, a sequence of such operations of the shutter blades is performed by a motor.

Meanwhile, among digital still cameras, there is known a camera having a diaphragm blade. In this case, there are two types of diaphragm mechanisms. One is adapted to have a plurality of diaphragm blades and enabled to continuously change the diameter of an exposure aperture. The other is adapted to selectively enter a preliminarily prepared aperture of a predetermined diameter into a proper exposure aperture. In either of the cameras respectively having the diaphragm mechanisms of these types, there are two manners of performing an exposure aperture control operation. One is to start an exposure aperture control operation in a stage in which a power supply switch is closed. The other is to perform the exposure aperture control operation after the release button is depressed, and before photographing is started. Moreover, recently, in most of the cameras, a diaphragm mechanism is actuated by a motor.

Furthermore, there has been developed a motor for actuating the shutter blade and the diaphragm blade in this manner, which is previously called "an iris motor" and recently called "a moving magnet motor". This motor is configured so that an output pin (or driving pin) extending in parallel with a rotation shaft of a rotor constituted by a permanent magnet (usually, a two-pole permanent one) is integrally formed therewith in a radial position of the rotor, and that the rotor can be turned by an angle within a predetermined range in a direction corresponding to a direction in which a current is supplied to a stator coil. Further, this motor can be manufactured at low cost and miniaturized still more and reduce power consumption, as compared with a stepping motor.

Although a moving magnet motor is advantageous in cost reduction, miniaturization, and power consumption reduction over a stepping motor, it is disadvantageous for the cost reduction and miniaturization of the camera that a motor for actuating the shutter blade is provided separately from a motor for actuating the diaphragm blade. Thus, preferably, it is sufficient for a camera to have only a single moving magnet motor. Moreover, desirably, the shutter blade is enabled to serve as the diaphragm blade, instead providing the shutter blade and the diaphragm blade separately from each other. Thus, there are expectations for the emergence of a shutter preferably configured so that two shutter blades relatively actuated by a single moving magnet motor serve as diaphragm blades, that the stopped state the shutter blades is maintained at an exposure aperture regulating position corresponding to a small-diameter exposure aperture instead of the proper exposure aperture at least during photographing since a moment just before the photographing is started, and that the shutter blades are closed from the exposure aperture regulating position when the photographing is finished. The present invention relates to a shutter for digital still cameras having such configuration.

Meanwhile, to actuate the shutter blades serving as the diaphragm blade by a single moving magnet motor, the shutter should be adapted so that the shutter blades are reliably stopped at least at three positions, namely, a fully opened position, an exposure aperture regulating position, and a closed position. This is achieved, namely, these positions, at which the shutter blades are stopped, are reliably maintained by satisfying the following requirements. That is, among the three positions, at the fully opened position, the stator coil of the motor is energized so that the shutter blades are operated in an opening direction in which these blades are opened. Further, at the closed position, the stator coil is energized so that the shutter blades are operated in a closing direction in which these blades close. Moreover, at each of the three positions, the rotor or each of the shutter blades is made to abut against a stopper.

However, such a shutter has a drawback in that when the energization the stator coil is once interrupted, the rotor can freely rotate and thus, the position of the rotor is not determined. Therefore, to reliably maintaining the fully opened position and the closed position of the rotor even when the energization of the stator coil is interrupted, it is sufficient that a plurality of magnetic material members are arranged in such a manner as to face the peripheral surface of each of the magnetic poles of the rotor, that an attractive force acting between the magnetic material members due to the magnetic force of the rotor provides torque to the rotor, and that the stopper prevents the rotor from rotating. Further, in the case of the shutter configured in such a manner, it is sufficient to energize the stator coil only when the shutter blades are actuated. Thus, this shutter has an advantage in that the power consumption can be reduced.

Further, even in the case that the stopped state of the shutter blades can be maintained at the fully opened position and the closed position by configuring the shutter in such a manner, it is very difficult to reliably stop each of the shutter blades at the exposure aperture regulating position. That is, as described above, in the case of using this kind of the motor, when the energization of the stator coil thereof is interrupted, the stopped position of the rotor cannot be determined. Thus, it is considered that the stopped state of the rotor is maintained at the exposure aperture regulating position by energizing the stator coil thereby to provide torque to the rotor and by causing the spring member to prevent the rotor from rotating. However, in such a case, the energization of the stator coil should be continued so as to maintain the exposure aperture regulating position. Furthermore, when the shutter blades are closed from the exposure aperture regulating position, the shutter blades should be operated against the pushing force of the spring member. Thus, this requires a larger amount electric power than that required to turn the rotor from the fully opened position to the exposure aperture regulating position. Consequently, this shutter has a drawback in that the power consumption is increased.

Thus, it is considered as another method that the position of the rotor is regulated by sandwiching a driving pin, which is integrally formed with the rotor, between two spring members respectively having pushing forces that act in different directions, or between both end portions of a torsion spring. However, in such a case, the rotor should be operated against the pushing force of each sprig both when the shutter blades are caused to perform the opening operation, and when the shutter blades are caused to perform the closing operation. Therefore, the power consumption of the shutter is not sufficiently reduced on the whole. Furthermore, in such a case, it is difficult to manufacture the shutter so that the rotor reliably stands still at the predetermined position. Even in the case that the shutter can be manufactured so that the rotor can stand still at the predetermined position, the rotor cannot be reliably held at the predetermined position owing to the fitting tolerance of a connecting portion between the driving pin of the rotor and the shutter blade.

SUMMARY THE INVENTION

Accordingly, an object of the present invention is to provide a shutter for digital still cameras, which is suitable for reducing the cost, size and power consumption, and which has a single motor of the type being capable of determining the direction of rotation of the rotor thereof according to a direction of flow of electric current supplied to a stator coil uses a driving pin integrally provided with the rotor to thereby cause two relatively operating shutter blades to perform opening and closing operations and is enabled by an extremely simple configuration to maintain the stopped state of each shutter blade at the three positions, namely, the fully opened position, the exposure aperture regulating position, and the closed position even when a stator coil is not energized.

To achieve the foregoing object, according to an aspect of the present invention, there is provided a shutter for digital still cameras, which comprises a motor having a rotor constituted by a two-pole permanent magnet integrally provided with a driving pin at a radial position thereof in such a manner as to extent in parallel with a rotation shaft thereof that reciprocatingly moves by a predetermined rotational angle from an initial position correspondingly to a direction, in which electric current is supplied to a stator coil, two shutter blades being operative to relatively operate together with the driving pin and to perform operations of opening and closing the exposure aperture, a plurality of magnetic holding means, disposed separately from one another in such a away as to face peripheral surface of each magnetic pole of the rotor, and configured so that an attractive force caused from a magnetic force of the rotor acting between the rotor and each of the plurality of magnetic holding means is exerted in one of directions of rotation of the rotor in a corresponding one of angular regions, the border between which corresponds to a midpoint angular position in the rotational angle, and pushing means for maintaining a small-diameter exposure aperture regulating state, which is caused by the two shutter blades, in cooperation with the attractive force by directly or indirectly preventing rotation of the rotor when energization of the coil is interrupted at the exposure aperture regulating position at which the rotor rotates beyond the midpoint angular position by a predetermined angle.

Further, in the case of an embodiment of the shutter for digital still cameras according to the present invention, the pushing means is adapted so that the pushing force thereof, which acts in such a manner as to cause the rotor and the two shutter blades to operate to the midpoint angular position, does not act at all or hardly acts at a position where the rotor stops after the rotor rotates beyond the exposure aperture regulating position in a direction opposite to the midpoint angular position. Thus, the stopped position, at which the rotor stops, in the closed state, in which the exposure aperture is closed, can be more reliably held.

Moreover, in the case an embodiment of such a shutter for digital still cameras according to the present invention, the pushing means is one or two torsion springs and adapted to be directly in contact with the two shutter blades. Thus, backlash due to the fitting tolerance between the driving pin of the rotor and the shutter blade is eliminated. Consequently, the shape of the small-diameter exposure aperture formed by the shutter blades can stably be obtained.

Furthermore, in the case of an embodiment of the shutter for a digital still camera according to the present invention, the pushing means is a torsion spring wound around the shaft outside a blade chamber. The small-diameter exposure aperture regulating state, which is caused by the two shutter blades, is maintained in a state in which both end portions of the torsion spring face an operating locus of each of the two shutter blades in the blade chamber and are engaged with at least one of two base plates tof he blade chamber. Thus, the configuration of the shutter is simplified. Consequently, a low-cost shutter is obtained.

BRIEF DESCRIPTION OF THE DRAWINGS

Other features, objects and advantages of the present invention will become apparent from the following description of a preferred embodiment with reference to the drawings in which like reference characters designate like or corresponding parts throughout several views, and in which.

DETAILED DESCRIPTION THE PREFERRED EMBODIMENT

Hereinafter, an embodiment of the present invention will be described in detail by referring to FIGS. 1 to 5. This embodiment is a normally open shutter to which the present invention is applied. First, the configuration of this shutter is described hereinbelow by referring to FIGS. 1 to 3. A shutter base plate 1 is made of a synthetic resin. A blade chamber is formed between the shutter base plate 1 and an auxiliary base plate 2. Both the base plates 1 and 2 are attached to each other by screws 3 and 4. Further, circular apertures 1a and 2a are formed in the central portions of the shutter base plate 1 and the auxiliary base plate 2, respectively. An exposure aperture is formed by concentrically arranging these apertures 1a and 2a. Furthermore, two sets of circular holes 1b and 2b, and 1c and 2c are formed so that the circular holes of each of the sets are respectively formed in the shutter base plate 1 and the auxiliary base plate 2 and concentrically arranged.

Figure 3:
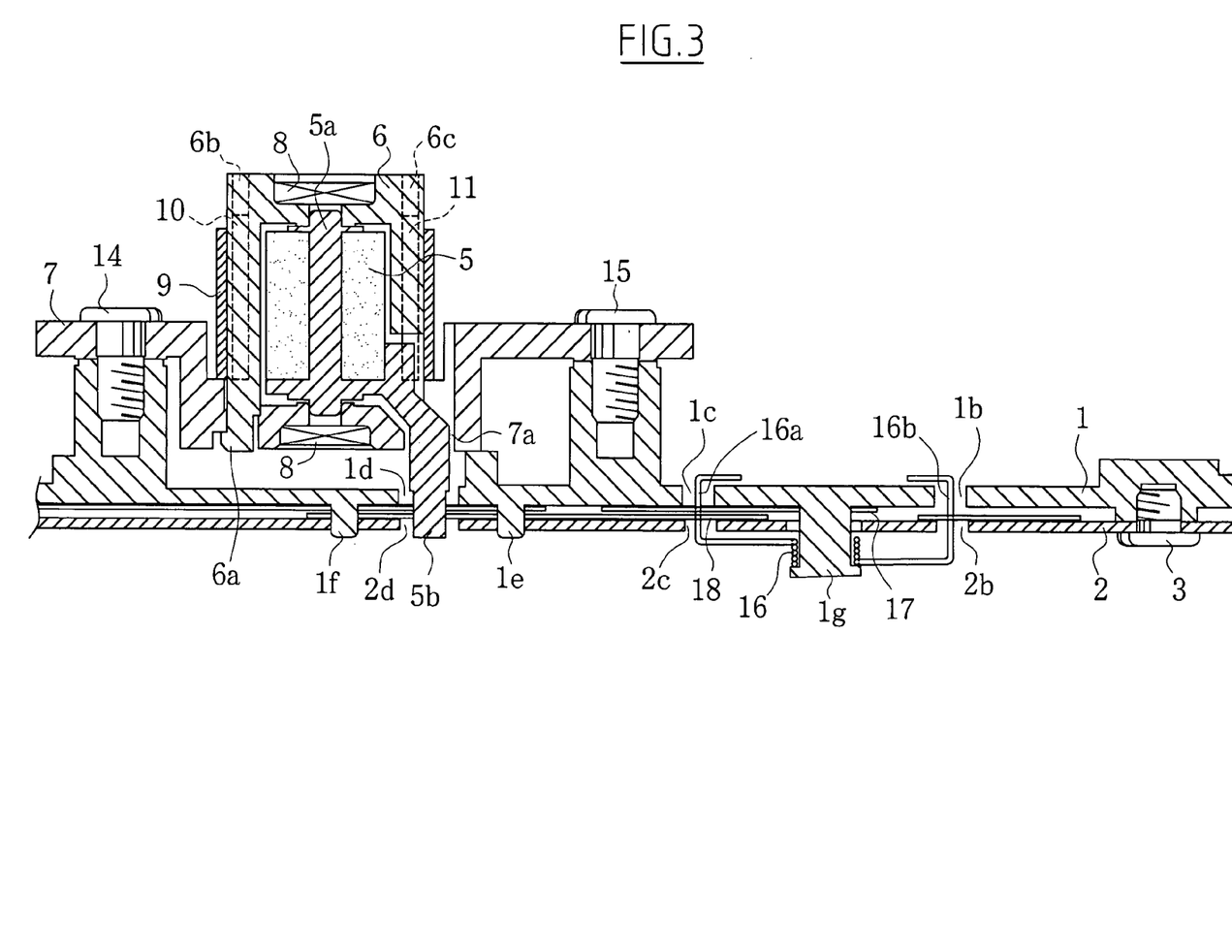
FIG. 3 is a sectional view of the embodiment for understanding the overlapping relation among constituent members of the embodiment.

A moving magnet motor is mounted on the top surface side, that is, the pickup-device-side of the shutter base plate 1. A rotor 5 is constituted by a two-pole permanent magnet magnetized in a radial direction. In this embodiment, each of a rotation shaft 5a and a driving pin 5b is made of a synthetic resin. Further, each of the rotation shaft 5 and the driving pin 5b, which is formed at a position in a radial direction of the rotation shaft 5a in such a way as to extend in parallel with the shaft 5a, is made of a synthetic resin and integrally outsert-molded with each other. Furthermore, the two magnetic poles are separated by a line passing through the rotation shaft 5a and the driving pin 5b. Moreover, a stator frame consists of an upper frame 6 and a lower frame 7, each of which is made of a synthetic resin. Both ends of the rotation shaft 5a are bearing-supported by these frames that are attached to each other through a plurality of hook portions 6a (only one of which is shown in FIG. 3) of the upper frame 6. Furthermore, an elongated hole 7a is formed in the lower frame 7. The driving pin 5b penetrates through the elongated hole 7a. Additionally, the driving pin 5b penetrates through an elongated hole 1d formed in the shutter base plate 1 and an elongated hole 2d formed in the auxiliary base plate 2. Further, a coil 8 is wound therearound in such a manner as to cover the bearing-support portions of the upper frame 6 and the lower frame 7.

Figure 1:
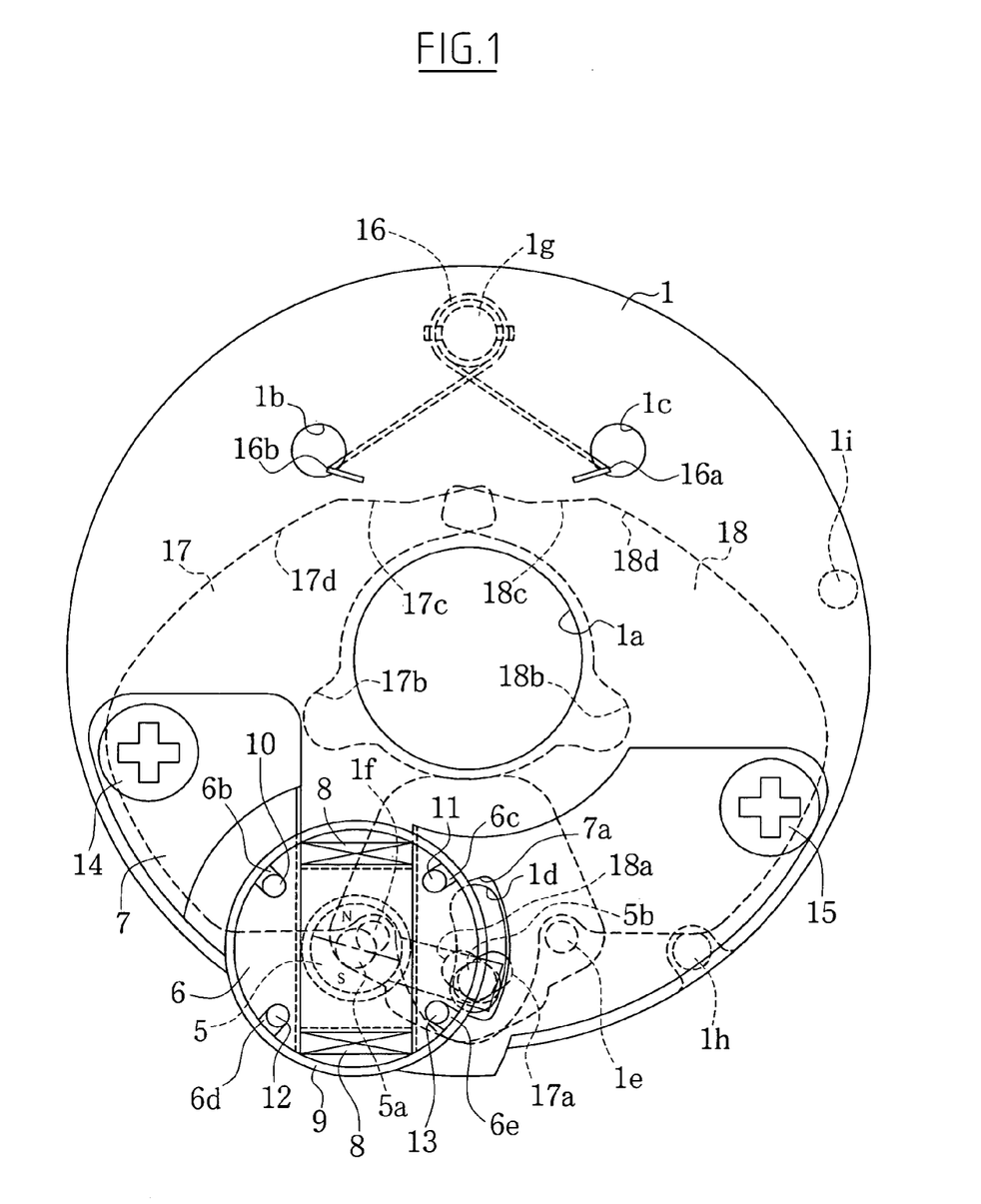
FIG. 1 is a plan view of an embodiment of the present invention, which is incorporated into a camera, when viewed from an image-pickup-device side.

Moreover, the upper frame 6 is cylindrically formed, and a cylindrical yoke 9 is fitted into an outer peripheral portion thereof. Furthermore, as illustrated in FIG. 1, four iron pins 10, 11, 12 and 13 (hereunder sometimes referred to generically as "holding means") are press-fitted into groove holes 6b, 6c, 6d, 6e formed in the upper frame 6, respectively. Further, the iron pins 10 and 11 are placed at positions, which are symmetrical to the positions of the iron pins 12 and 13 with respect to a horizontal line passing through the rotation shaft 5a. Furthermore, the motor constructed in this way is attached to the shutter base plate 1 with two screws 14 and 15.

Figure 2:
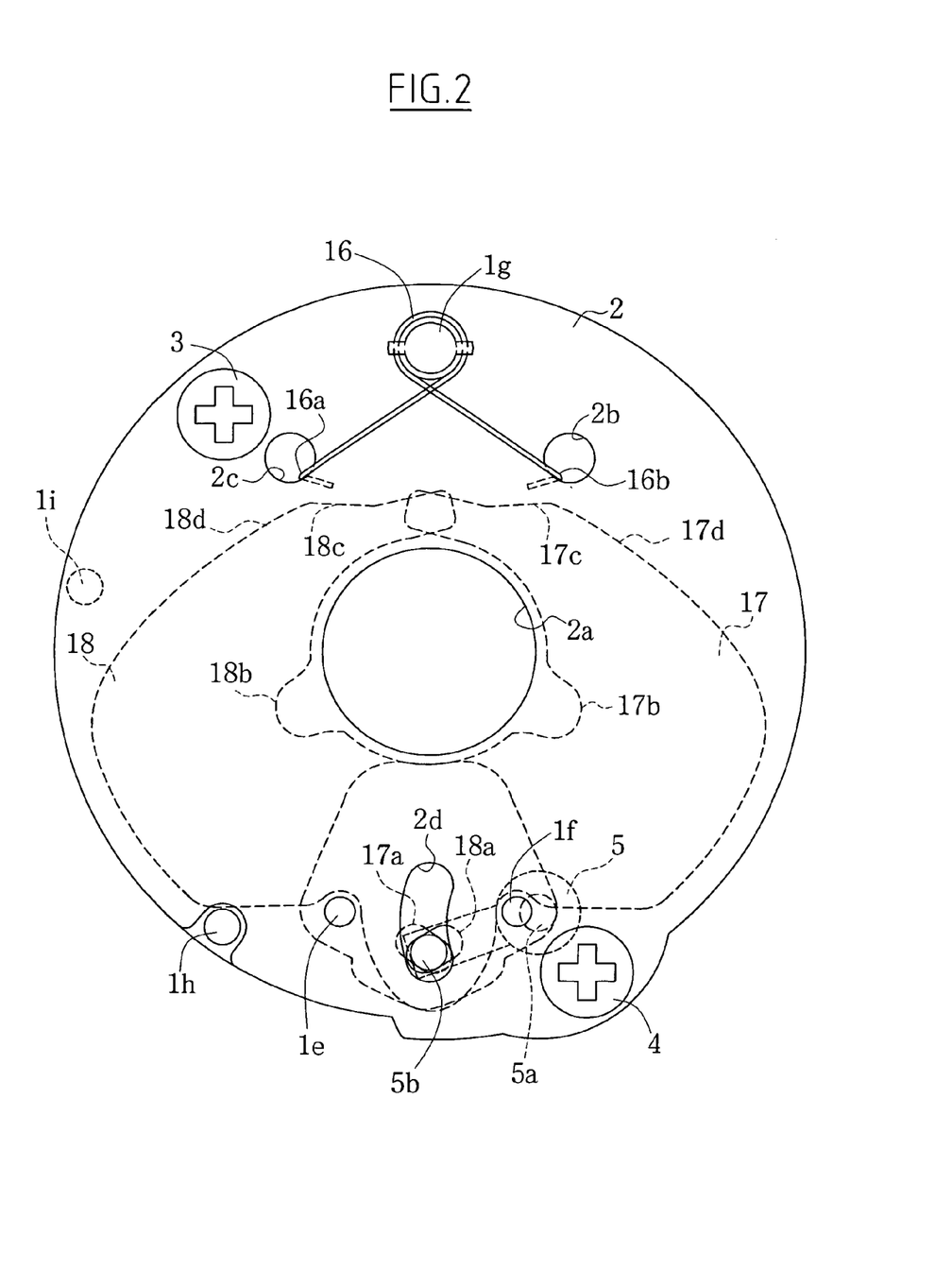
FIG. 2 is a rear view of the embodiment illustrated in FIG. 1.

Next, the configuration of the rear side of the shutter base plate 1 is described hereinbelow. Three shafts 1e, 1f, and 1g and two stoppers 1h and 1i are formed on the shutter base plate 1 in such a way as to be integral with one another. Among these shafts and stoppers, the end portions of the shafts 1e and 1f and the stopper 1h are fitted into the holes formed in the auxiliary base plate 2. Further, the shaft 1g penetrates through the hole formed in the auxiliary base plate 2 and largely protrudes from the rear side thereof. A spring 16 is wound around such a projection. The spring 16 has bent portions 16a and 16b respectively formed at both ends thereof. As shown in FIGS. 1 and 2, the bent portion 16a is engaged with the holes 1c and 2c, while the bent portion 16b is engaged with the holes 1b and 2b. As will be described in the following description, these bent portions 16a and 16b face inside the operating locus of each of the shutter blades, and are moved in the holes by the operations of the shutter blades.

A pair of shutter blades 17 and 18 is rotatably connected to each of the shafts 1e and 1F. The driving pin 5b is fitted into elongated holes 17a and 18a of the shutter blades 17 and 18. Thus, when the rotor 5 is turned counterclockwise as viewed in FIG. 1, the shutter blades 17 and 18 perform a closing operation. Therafter, when the rotor 5 rotates clockwise, the shutter blades 17 and 18 perform an opening operation. Further, each of these shutter blades 17 and 18, which are of the same shape, has a corresponding exposure aperture regulating portions 17b and 18b for regulating a small-diameter apertures, a corresponding one of pushing means 17c and 18c for stretching the spring 16, and a corresponding one of engaging portions 17d and 18d for maintaining the stretched state of the spring 16.

Next, an operation of this embodiment is described hereinbelow. The shutter blades do not cover the entire surface of the image pickup device except when the shutter is in a state caused just upon completion of photographing. Further, FIGS. 1 and 2 illustrate a state in which the camera is not used, that is, a power supply switch is not closed. Thus, in this state, naturally, a coil 8 is not energized. However, this embodiment is enabled to reliably maintain the rotational position of the rotor 5 by the action of a magnetic force of the rotor 5.

That is, in this state, the magnitude of an attractive force acting between the N-pole of the rotor 5 and the iron pin 11 is larger than that of an attractive force acting between the N-pole of the rotor 5 and the iron pin 10. Further, the magnitude of an attractive force acting between the S-pole of the rotor 5 and the iron pin 12 is larger than that of an attractive force acting between the S-pole of the rotor 5 and the iron pin 13. Thus, a force for turning the rotor 5 clockwise is provided to the rotor 5. Furthermore, the driving pin 5b pushes the shutter blades 17 and 18 in an opening direction in which the exposure aperture is opened. However, the stopper 1h prevents the shutter blade 18 from operating, so that this state is maintained. Incidentally, such a state is sometimes maintained under some conditions even when the iron pins 10 and 12 are omitted or the iron pins 11 and 13 are omitted. However, in consideration of reliability, this embodiment has all of such iron pins.

When the shutter is in the state illustrated in FIGS. 1 and 2, the power supply switch is first closed. Among cameras each having a monitor, there is known a camera enabled to automatically set a diaphragm aperture, which meets depth-of-field requirements, by the action of a photometer or a range finder when a power supply switch is closed, even in the case that a release button is not depressed. The present invention can be applied to a camera of such a type. However, the following description describes the case of using the shutter of the present invention in a camera of the type, in which the diaphragm aperture is not automatically set only by closing the power supply switch. Therefore, in the case of this embodiment, the coil 8 is not energized even when the power supply switch is closed. Consequently, the state illustrated in FIGS. 1 and 2 are maintained as it is.

Thus, first, an operation of this embodiment in the case of selecting a small-diameter exposure aperture at the time of photographing is described hereinbelow. When a release button is depressed so as to take a picture, the energization of the coil 8 is started in such a manner as to supply electric current thereto in a forward direction, and the rotor 5 is rotated counterclockwise against a holding force acting between the rotor 5 and the holding means (or iron pins). Further, needless to say, this holding force weakens as the rotor 5 rotates. Furthermore, as the rotor 5 rotates, the rotor 5 causes the shutter blades 17 and 18 by using the driving pin 5b to relatively operate, so that the aperture 1a is closed.

Then, the rotor 5 reaches a midpoint angular position in the rotational angle by which the rotor 5 can rotate. That is, the rotor 5 reaches a position just before the position illustrated in FIG. 4. Further, at the midpoint angular position, the border between the N-pole region and the S-pole region is in a horizontal position illustrated in FIG. 4. Thus, the positions of the iron pins 10 and 11 are symmetrical to those od the iron pins 12 and 13 with respect to the border. Therefore, in the case that the energization the coil 8 for supplying a current thereto in a forward direction is interrupted when the rotor 5 reaches the midpoint angular position, theoretically, the rotor 5 stops at the midpoint angular position, and this stopped state of the rotor 5 is maintained, on condition that the inertial forces of the rotor 5 and the shutter blades 17 and 18 are not take into consideration.

However, it is very difficult to achieve the stopped state at the midpoint angular position in this way. In the case that the rotor 5 does not stop at the midpoint angular position but the actually stopped position of the rotor 5 is a little deviated from the midpoint angular position, the balance among the holding forces acting among the holding means is lost, so that the rotor 5 rotates in one the rotational directions. Therefore, to stop the rotor 5 at the midpoint angular position even when the balance among the holding forces is lost, the rotation the rotor 5 should be regulated by two position regulating members. However, even in such a case, there is a problem that a small-diameter exposure aperture regulating state, in which the diameter of the small-diameter exposure aperture is regulated by the shutter blades 17 and 18, is extremely unstable owing to the presence of the fitting tolerance between the driving pin 5b and each of the elongated holes 17a and 18a of the shutter blades 17 and 18.

Thus, this embodiment is adapted so that the rotor 5 is reliably stopped at a position slightly deviated in a counterclockwise direction from the midpoint angular position, instead of being stopped at the midpoint angular position, and that a small-diameter exposure aperture is stably obtained. That is, in the state illustrated in FIG. 4, the magnitude of an attractive force acting between the N-pole of the rotor 5 and the iron pin 10 is slightly larger than that of an attractive force acting between the N-pole of the rotor 5 and the iron pin 11. Further, the magnitude of an attractive force acting between the S-pole of the rotor 5 and the iron pin 13 is slightly larger than that of an attractive force acting between the S-pole of the rotor 5 and the iron pin 12. Consequently, a force for causing the rotor 5 to rotate counterclockwise is exerted on the rotor 5. Therefore, the shutter blades 17 and 18 are pushed in a closing direction, in which these blades are closed, by the driving pin 5b.

Figure 4:
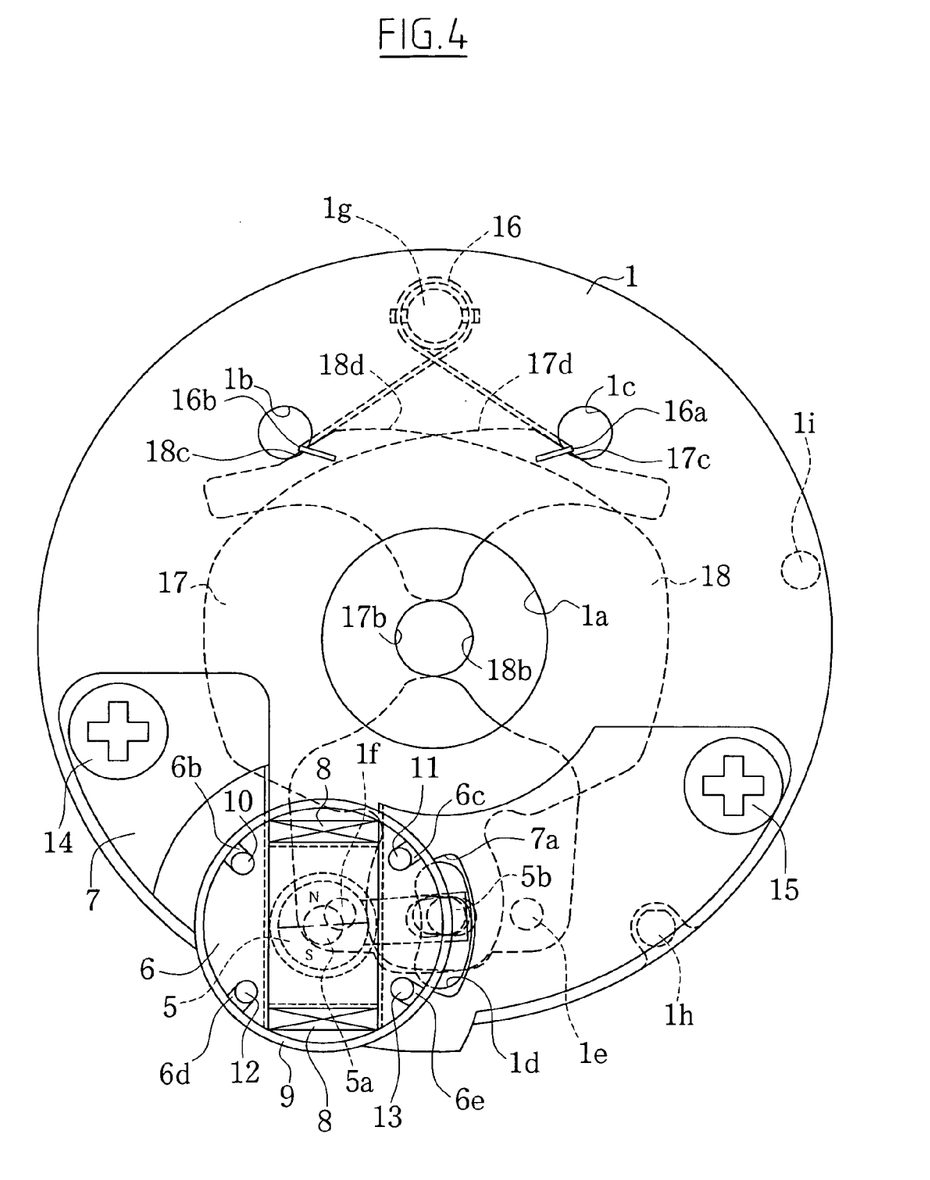
FIG. 4 is a plan view of the embodiment in the case using a small-diameter exposure aperture.

Further, the pushing portions 17c and 18c of the shutter blades 17 and 18 are in contact with the bent portions 16a and 16b of the spring 16. However, the magnitude of the pushing force of the spring 16 is larger than that of the force causing the shutter blades 17 and 18 to close. Thus, this state illustrated in FIG. 4 is maintained during the non-energization state of the coil. Furthermore, the driving pin 5b and the spring 16 push the shutter blades 17 and 18 in opposite directions. Thus, the problem due to the fitting tolerance between the driving pin 5b and each of the elongated holes 17a and 18a does not occur. Consequently, the exposure aperture regulating portions 17b and 18b appropriately maintain the small-diameter exposure aperture.

Figure 5:
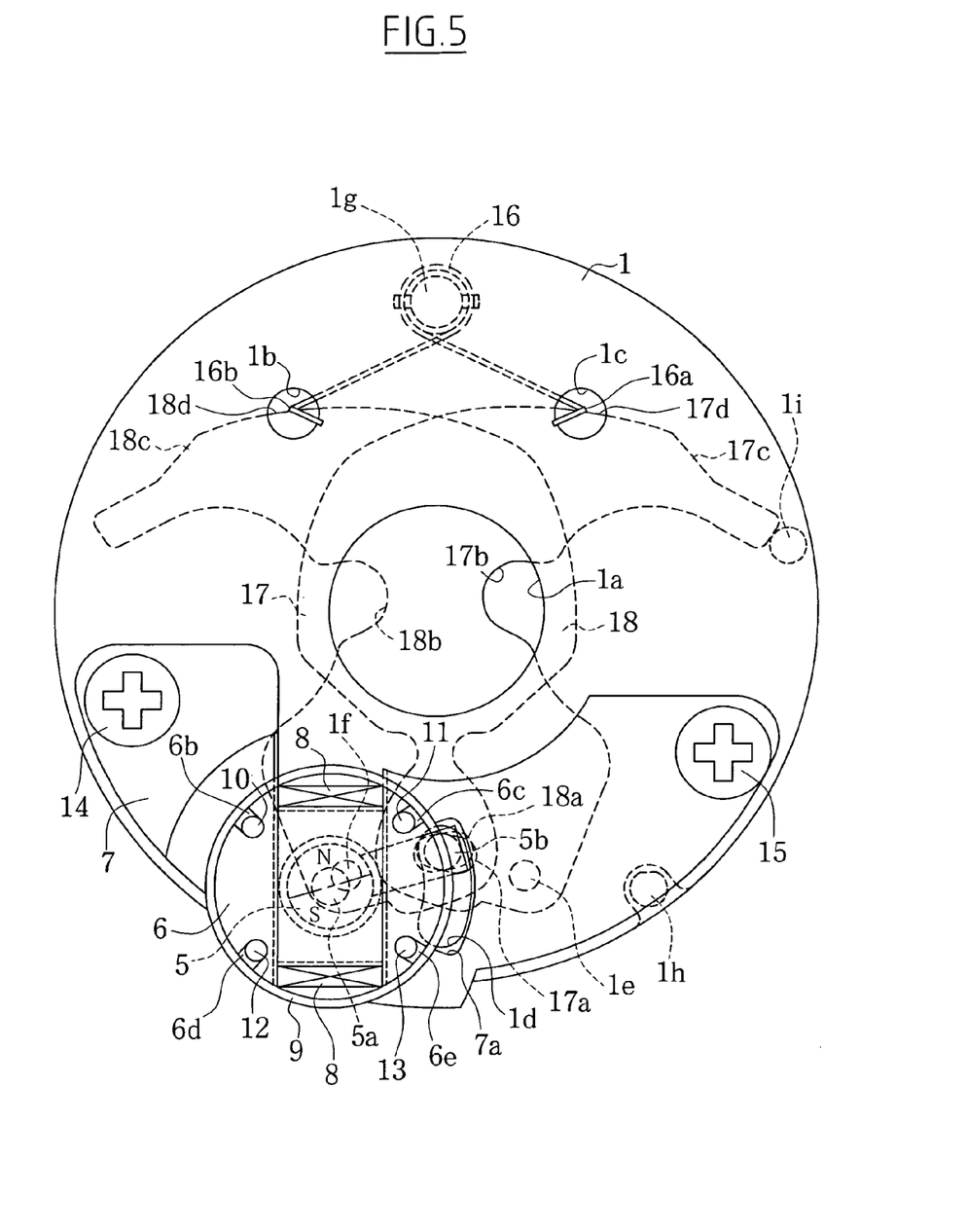
FIG. 5 is a plan view of the embodiment, which illustrates the closed state of shutter blades.

The small-diameter exposure aperture is formed in this way. Subsequently, a photographing start signal is supplied to the image pickup device. Further, when a predetermined photographing time elapses, a control circuit issues a closing signal for closing the shutter blades 17 and 18. In response to this signal, the energization of the coil 8 is started again in such a manner as to supply a current in a forward direction thereto. Thus, the rotor 5 is rotated counterclockwise still more from the position illustrated in FIG. 4. The aperture 1a is closed by the shutter blades 17 and 18, as illustrated in FIG. 5. Then, the photographing is finished. The rotation of the rotor 5 is stopped by causing an end portion of the shutter blade 17 to abut against the stopper 1i. Incidentally, when the shutter blades 17 and 18 are closed from the position illustrated in FIG. 4, these shutter blades are moved against the pushing force of the spring 16. Thus, the closing operation is preferably achieved by setting the current value of electric current, which is supplied to the coil 8 at that time, (or by setting the voltage value) to larger than that supplied in the case that the closing operation is performed until the rotor 5 is rotated to the exposure aperture regulating position.

Although the present invention inhibits the coil 8 from being energized in the state illustrated in FIG. 5 in such a way as to supply electric current in a forward direction thereto, the energization of the coil 8 for supplying electric current thereto in a forward direction is interrupted in this embodiment for the purpose of saving the power consumption, so that the Coil 8 is put into a non-energized state. Further, even in such case, the state illustrated in FIG. 5 is reliably maintained for the following reason. That is, in this state, the magnitude of an attractive force acting between the N-pole of the rotor 5 and the iron pin 10 is larger than an attractive force acting between the N-pole of the rotor 5 and the iron pin 11. Moreover, the magnitude of an attractive force acting between the S-pole of the rotor 5 and the iron pin 13 is larger than an attractive force acting between the S-pole of the rotor 5 and the iron pin 12. Thus, a force causing the rotor 5 to rotate counterclockwise is provided thereto. On the other hand, the bent portions 16a and 16b of the spring 16 are in contact with the engaging portions 17d and 18d, which are formed like arcs respectively centered on the shafts 1e and 1f, of the shutter blades 17 and 18. Thus, the pushing force for pushing the shutter blades 17 and 18 in a direction, in which these blades open, does not act at all. Even when slightly acts thereon, the magnitude of such a force is far smaller than that of the force caused by the holding means.

Incidentally, as is understood from this, in the case of this embodiment, the timing, with which the energizing of the coil 8 is interrupted, can be set so that the energization thereof is interrupted before the shutter blades 17 and 18 close the aperture 1a and stop. That is, unless the magnitude of a resultant force of the force, which is caused due to the presence of the holding means in such a way as to rotate the rotor 5 counterclockwise, and the inertial forces of the shutter blades 17 and 18 is smaller than the force of the spring 16, which causes the rotor 5 to rotate clockwise, the shutter blades 17 and 18 continue to perform the closing operation until each of these blades reach the closed position illustrated in FIG. 5. However, preferably, the closing operation is achieved as quickly as possible. Thus, it is not preferable that the energization of the coil is interrupted well before these blades 17 and 18 close the aperture 1a.

When data representing a result of the photographing is stored in a storage device after the aperture 1a is closed in this manner, the shutter blades 17 and 18 are caused to perform the opening operation. In this case, conversely to the aforementioned case, the energization of the coil 8 is performed in such a manner as to supply electric current in a reverse direction. Therefore, a force causing the rotor 5 to rotate clockwise is provided thereto. Thus, the rotor 5 is rotated clockwise against the holding force of the holding means, which causes these blades to move to the closed position. After passing through the position illustrated in FIG. 4, the rotor 5 is stopped by causing the shutter blade 18 to abut against the stopper 1h. Further, the larger the current value of electric current (or the voltage value of a voltage)

supplied to the coil 8 becomes, the more quickly the opening operation of the shutter blades 17 and 18 is achieved at that time. Further, subsequently, the energization of the coil 8 is interrupted, so that the shutter is reset to the state illustrated in FIGS. 1 and 2. This state is maintained until the next photographing is performed in the aforementioned manner.

Incidentally, needless to say, even when the energization of the coil 8 is interrupted after the rotor 5 rotates beyond the midpoint angular position halfway through the opening operation, the rotor 5 is returned to the state illustrated in FIG. 1 by the action of the attractive force acting between the rotor 5 and the holding means. Further, in the case where the shutter is set in this embodiment so that the photographing is successively performed, and in the case that the small-diameter exposure aperture is automatically set when the power supply switch is closed, differently from the case this embodiment, the rotor is stopped at the position illustrated in FIG. 4 and the shutter gets ready for the next photographing at this position when the energization of the coil 8 is interrupted at the time, at which the rotor 5 reaches close to the position illustrated in FIG. 4 in the course of the resetting operation.

Next, the case of photographing by using the large-diameter exposure aperture 1a, namely, the exposure aperture without selecting the small-diameter exposure aperture in the aforementioned manner is described hereinbelow. Incidentally, parts of the following description, which may overlap with the foregoing description of the case of selecting the small-diameter aperture, are omitted or simplified. First, when a release button is depressed so as to take a picture, a photographing start signal is immediately supplied to the image pickup device, such as CCD, in this case. Then, after a lapse of a predetermined photographing time, the control circuit issues a closing signal to each of the shutter blades 17 and 18. Thus, the energization of the coil 8 is started in such a manner as to supply electric current thereto in a forward direction, and thus the rotor 5 is rotated counterclockwise from the position illustrated in FIG. 1.

Consequently, the shutter blades 17 and 18 are relatively actuated by the driving pin 5b to thereby close the aperture 1a. However, even when the blades 17 and 18 reach the position illustrated in FIG. 4, these shutter blades do not stop. The pushing portions 17c and 18c push the bent portions 16a and 16b. Thus, the same operation is continued. Then, even in the case that the energization of the coil 8 is interrupted when these blades reach the position illustrated in FIG. 5, the rotor 5 is not rotated clockwise by the pushing force of the spring 16. That is, this state is maintained. Further, as described above, the timing, with which the energization of the coil 8 is interrupting, may be set so that the energization thereof is interrupted immediately before the shutter blade 17 abuts against the stopper 1i. Then, after the shutter blades 17 and 18 close the aperture 1a, data representing a result of the photographing is stored in the storage device. Subsequently, the shutter is reset. Such an operation performed in this case is substantially the same as that in the case of selecting the small-diameter exposure aperture.

Meanwhile, even in the case that a relatively large number of holding means are provided in the shutter like this embodiment, and that the fully open state and the closed state of the aperture 1a are thus reliably maintained, this is achieved by utilizing only the magnetic force of the rotor 5. Thus, it is not ensured that the positions of the shutter blades 17 and 18, namely, the rotational position of the rotor 5 are normal positions illustrated in FIGS. 1 and 5 at the moment at which the energization of the coil 8, which has been in the non-energized state, is started. Moreover, because a time period, in which the shutter is in the state illustrated in FIG. 5, is very short, there is almost no likelihood that the shutter blades 17 and 18, and the rotor 5 are not in the normal positions. Even when such an unfavorable situation occurs, the shutter is then reset to the state illustrated in FIG. 1. Consequently, there is no problems in particular. However, when such an unfavorable situation occurs during the shutter is in the state illustrated in FIG. 1, there is a fear that a serious problem occurs.

Thus, now consider the case that such an unfavorable situation occurs when the small-diameter exposure aperture is selected. It is preliminarily determined according to design specifications how long a forward current for energization is supplied to the coil 8 so as to rotate the rotor 5, which has been in the position illustrated in FIG. 1, and as to then stop the rotor 5 in the position illustrated in FIG. 4. Therefore, in the case that the rotor 5 is rotated counterclockwise from the position illustrated in FIG. 1 when the energization of the coil 8 is started in such a way as to supply a current in a forward direction, the rotor 5 is rotated counterclockwise by a considerable amount from the position illustrated in FIG. 4. Thus, the bent portions 16a and 16b of the spring 16 may be in contact with the engaging portions 17d and 18d of the shutter blades 17 and 18. Further, when the energization og the coil 8 is interrupted, the magnitude of the force acting between this spring and the holding means in such a way as to attract and return the blades to the closed position is larger than the pushing force of the spring 16, the rotor 5 does not return to the position illustrated in FIG. 4 but is rotated to the position thereof illustrated in FIG. 5. That is, the shutter is brought into a state to be caused just upon completion of photographing.

Thus, to prevent an occurrence of such a phenomenon, although the set-up of the shautter is a little time-consuming, it is sufficient that the energization of the coil 8 in such a manner as to supply a current thereto in a reverse direction is performed for a predetermined time before the energization of the coil 8 having been in the state illustrated in FIG. 1 is performed in such a manner as to supply a current thereto in a forward direction, and that therefore, the energization the coil 8 for supplying a current thereto in a forward direction is performed after the rotor 5 is pushed in such a way as to rotate clockwise by once performing the energization of the coil 8 for a predetermined time in such a manner as to supply a current thereto in a reverse direction. Furthermore, in the case of photographing by using a large-diameter exposure aperture, a similar phenomenon presents a serious problem. In such a case, it is sufficient that the energization of the coil 8 for supplying a current thereto in a reverse direction is once performed before a photographing start signal is provided to the image pickup device.

Incidentally, the aforementioned embodiment is adapted so that the energization of the coil 8 for supplying a current in a forward direction is interrupted in a state in which the shutter blades 17 and 18 are closed. However, the present invention is applicable to the case that the energization of the coil 8 for supplying a current thereto in a forward direction is continued until the energization thereof for supplying a current thereto in a reverse direction is performed. Further, although the aforementioned embodiment is adapted so that the single spring 16 can push the shutter blades 17 and 18, this single spring 16 may be replaced with two separate springs. Moreover, this spring 16 may be wound around the shaft 1g in the blade chamber. Furthermore, although the aforementioned embodiment is adapted so that the spring 16 can directly push the shutter blades 17 and 18, these shutter blades may be pushed by this spring through another constituent member. Additionally, the present invention does not inhibit the shutter from being adapted so that the spring 16 directly pushes the rotor 5. However, according to the embodiment, the configuration of the entire shutter is simplified. Moreover, the assembling of the shutter is facilitated. Furthermore, the predetermined functions can reliably be realized.

As described above, according to the present invention, there is provided a shutter for digital cameras, in which a single moving magnet motor having a permanent magnet rotor adapted to reciprocatingly rotate within a predetermined rotation angle range according to a direction of flow of electric current supplied to a stator coil uses a driving pin integrally provided with the rotor to thereby cause two relatively operating shutter blades to perform opening and closing operations. Moreover, the shutter of the present invention is enabled by an extremely simple configuration to accurately stop each shutter blade at the three positions, namely, the fully opened position, the exposure aperture regulating position, and to preferably maintain the stopped state of each of the shutter blades. Thus, the shutter the present invention is extremely advantageous in cost reduction and miniaturization of a shutter for digital still cameras. Moreover, the shutter of the present invention can reliably maintain the stopped state of the rotor at all the three positions without energizing the stator coil. Consequently, the shutter of the present invention is extremely advantageous in saving the power consumption a shutter.

Although the preferred embodiment of the present invention have been described above, it should be understood that the present invention is not limited thereto and that other modifications will be apparent to those skilled in the art without departing from the spirit the invention.

The scope of the present invention, therefore, should be determined solely by the appended claims.

What is claimed is:

1. A shutter for digital still cameras, comprising:
    a motor having a stator including an energizing coil, having a rotor constituted by a two-pole permanent magnet and reciprocatingly movable in accordance with a direction of a current supplied to said coil for a predetermined rotational angular range, and having a driving pin integrally provided with said rotor and extending in parallel with a rotation shaft of said rotor;
    two shutter blades configured to be relatively moved by said driving pin to open and close an exposure aperture;
    a plurality of magnetic holding members respectively disposed against each magnetic pole of said rotor, and configured so that an attractive force caused from a magnetic force of said rotor acting between said rotor and each of said plurality of magnetic holding members is exerted to rotate said rotor in either direction from a midpoint angular position in the predetermined rotational angular range; and
    a forcing device configured to directly or indirectly prevent rotation of said rotor, when energization of said coil is interrupted at an exposure aperture regulating position of said rotor where said rotor has been rotated from the midpoint angular position by a predetermined angle within an angular range that is narrower than the predetermined rotational angular range, by exerting an urging force against the attractive force, so as to maintain a small-diameter aperture regulating state formed by said two shutter blades.

2. A shutter for digital still cameras according to claim 1, wherein the urging force of said forcing device, which is exerted, at the exposure aperture regulating position, on said rotor and said two shutter blades in a direction for the midpoint angular position, does not act at all or hardly acts at a position where said rotor stops after said rotor has rotated beyond the exposure aperture regulating position in a direction opposite to the midpoint angular position.

3. A shutter for digital still cameras according to claim 1 or 2, wherein said forcing device is one or two torsion springs and adapted to be directly in contact with said two shutter blades.

4. A shutter for digital still cameras according to claim 1 or 2,
    wherein said forcing device is a torsion spring wound around said shaft outside a blade chamber, and wherein the small-diameter aperture regulating state, which is caused by said two shutter blades, is maintained in a state in which both end portions of said torsion spring are positioned respectively on an operating locus of each of said two shutter blades in said blade chamber and are engaged with at least one of two base plates of said blade chamber.

5. A shutter for digital still cameras, comprising:
    a motor having a stator including an energizing coil, having a rotor constituted by a two-pole permanent magnet and reciprocatingly movable in accordance with a direction of a current supplied to said coil for a predetermined rotational angular range, and having a driving pin integrally provided with said rotor and extending in parallel with a rotation shaft of said rotor;
    two shutter blades configured to be relatively moved by said driving pin to open and close an exposure aperture;
    a plurality magnetic holding members respectively disposed against each magnetic pole of said rotor, and configured so that an attractive force caused from a magnetic force of said rotor acting between said rotor and each of said plurality of magnetic holding members is exerted to rotate said rotor in either direction from a midpoint angular position in the predetermined rotational angular range; and
    a forcing device configured to directly or indirectly prevent rotation of said rotor in cooperation with the attractive force, when energization of said coil is interrupted at an exposure aperture regulating position of said rotor where said rotor has been rotated beyond the midpoint angular position by a predetermined angle, so as to maintain a small-diameter aperture regulating state formed by said two shutter blades,
    wherein said forcing device is a torsion spring wound around said shaft outside a blade chamber, and wherein the small-diameter aperture regulating state, which is caused by said two shutter blades, is maintained in a state in which both end portions of said torsion spring are positioned respectively on an operating locus of each of said two shutter blades in said blade chamber and are engaged with at least one of two base plates of said blade chamber.

6. A shutter for digital still cameras according to claim 5, wherein the urging force of said forcing device, which is exerted, at the exposure aperture regulating position, on said rotor and said two shutter blades in a direction for the midpoint angular position, does not act at all or hardly acts at a position where said rotor stops after said rotor has rotated beyond the exposure aperture regulating position in a direction opposite to the midpoint angular position.

* * * * *